United States Patent [19]

Newland et al.

[11] 4,189,366

[45] Feb. 19, 1980

[54] RADIATION CURABLE COMPOSITIONS CONTAINING 5-HALO-6-HALOMETHYLURACIL DERIVATIVES AS PHOTOINITIATORS

[75] Inventors: Gordon C. Newland; Edward U. Elam; James G. Pacifici, all of Kingsport; Hobert M. Beard, Jr., Jonesboro, all of Tenn.

[73] Assignee: Eastman Kodak Company, Rochester, N.Y.

[21] Appl. No.: 3,568

[22] Filed: Jan. 15, 1979

[51] Int. Cl.$^2$ .............................. C08F 2/46; C08F 4/00
[52] U.S. Cl. ........................... 204/159.23; 204/159.15; 204/159.16; 204/159.18; 204/159.19; 204/159.24; 427/54.1; 428/431; 428/442; 544/313; 526/204
[58] Field of Search ............... 204/159.19, 159.18, 204/159.23, 159.24, 159.15; 96/115 P; 544/313; 427/44, 54; 428/431, 442

[56] References Cited

U.S. PATENT DOCUMENTS

| | | | |
|---|---|---|---|
| 3,254,082 | 5/1966 | Loux et al. | 260/260 |
| 4,040,923 | 8/1977 | Pacifici et al. | 204/159.15 |
| 4,043,887 | 8/1977 | Pacifici et al. | 204/159.23 |
| 4,080,382 | 3/1978 | Pacifici et al. | 260/591 |
| 4,089,815 | 5/1978 | Reiter et al. | 260/2 R |
| 4,113,592 | 9/1978 | Rybny et al. | 204/159.16 |

Primary Examiner—Richard B. Turer
Attorney, Agent, or Firm—Donald W. Spurrell; Daniel B. Reece, III

[57] ABSTRACT

Ethylenically unsaturated compositions such as acrylic and methacrylic acid esters, vinyl esters, vinyl halides, unsaturated amides such as acrylamide, vinyl aromatics such as styrene, and various aliphatic and aromatic polyesters containing any of the above or other modifying components such as maleic, fumaric, itaconic, citraconic and the like, are very effectively and rapidly cured with certain 5-halo-6-halomethyluracil photoinitiators. These curable systems have extensive utility in the surface coatings industry, particularly in regard to cured protective coatings.

6 Claims, No Drawings

RADIATION CURABLE COMPOSITIONS CONTAINING 5-HALO-6-HALOMETHYLURACIL DERIVATIVES AS PHOTOINITIATORS

This invention concerns ethylenically unsaturated compositions such as acrylic and methacrylic acid esters, vinyl esters, vinyl halides, unsaturated amides such as acrylamide, vinyl aromatics such as styrene, and various aliphatic and aromatic polyesters containing any of the above or other modifying components such as maleic, fumaric, itaconic, citraconic and the like, are very effectively and rapidly cured with certain 5-halo-6-halomethyluracil photoinitiators. These curable systems have extensive utility in the surface coatings industry, particularly in regard to cured protective coatings.

In protective coatings, decorative coatings and ink formulations, for example, the solid protective or decorative materials of the formulations are applied conventionally from solutions in organic solvents with said materials being deposited by evaporation of considerable amounts of solvent. Such procedures are by nature wasteful of solvent, are hazardous and require heavy use of energy to facilitate evaporation of the solvent. In a related manner, printing inks are also solutions which rely upon the evaporation of the solvent carrier for drying. Heat is usually necessary to speed the drying of the inks and thus limits the press speed.

The formation of protective coatings and films through polymerization is a route which has been adopted to avoid the use of solvent-based materials. Since no solvents are incorporated and all the polymeric composition is utilized in the coating, waste and pollution are essentially eliminated. This method consists typically of the addition of an additive to the monomer which, upon irradiation with light, fragments to free radicals and thus initiates free radical polymerization. Such additives are referred to as photoinitiators and are a vital part of the coating composition. The use of poor photoinitiators results in prolonged irradiation periods to effect polymerization or in incomplete polymerization and low quality coating. An objective of this invention therefore is to provide photoinitiators which are highly superior in initiating polymerization of a wide variety of monomeric materials when subjected to actinic radiation. This and other objects hereinafter appearing have been attained in accordance with the present invention through the discovery that 5-halo-6-halomethyluracils are outstanding photoinitiators for initiating and completing the curing of unsaturated compositions.

The photoinitiators of the present invention are used in a total concentration based on monomer weight of from about 0.1 to about 5.0%, and comprise one or more of the compounds of the general formula:

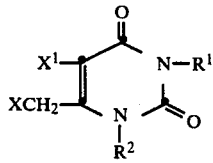

wherein $R^1$ and $R^2$ each is selected from hydrogen; straight or branched alkyl of 1-20 carbons which may be substituted with lower (1-6 carbons) alkoxy or phenoxy; alicyclic of 5-10 carbons; aromatic of 6-12 carbons which may be substituted with up to four lower (1-6 carbons) alkyl groups; and

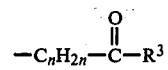

groups wherein n is 1-20, $R^3$ is lower alkyl, aromatic of 6-12 carbons or the radical —O—$R^4$ where $R^4$ is lower alkyl or aromatic of 6-12 carbons; and wherein X and $X^1$ are each selected from chlorine and bromine. These photoinitiators are generally activated by light of from about 250-400 nanometers.

The ethylenically unsaturated material can be, for example, alkyl (1-20 carbons) and substituted alkyl esters of acrylic and methacrylic acid such as methyl methacrylate, ethyl methacrylate, 2-ethylhexyl acrylate, hexyl acrylate, 2-hydroxyethyl acrylate, 2-hydroxy propyl acrylate and the like. Also included are the polyacrylyl compounds represented by the general formula:

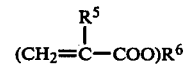

wherein $R^5$ is hydrogen or methyl and $R^6$ is for example a di-, tri-, or tetravalent aliphatic hydrocarbon of 1–10 carbons such as

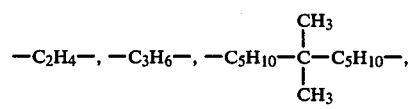

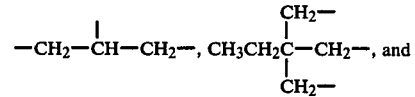

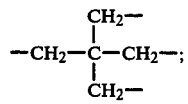

a divalent group $+C_rH_{2r}O+_tC_rH_{2r}-$ in which r is 2–8 and t is 1 to 10 such as oxyethylene, oxypropylene, oxybutylene, polyoxyethylene, polyoxypropylene, polyoxybutylene, polyoxyethylene-polyoxypropylene; and groups containing carbonyloxy linkages such as —CH$_2$—C(CH$_3$)$_2$COOCH$_2$C(CH$_3$)$_2$CH$_2$—. Other unsaturated monomers useful in the invention are vinyl acetate; vinyl and vinylidene halides e.g., vinylidene chloride and vinyl chloride; amides, e.g., acrylamide, diacetoneacrylamide; vinyl aromatics, e.g., styrene, nuclear substituted alkyl (1-20 carbons) styrenes, halostyrene, and divinyl benzene. In addition, other unsaturated compounds which can be polymerized with the present uracil photoinitiators are polyesters prepared by the reaction of α,β-unsaturated dicarboxylic acid and/or their anhydrides with polyhydric alcohols. Examples of such α,β-unsaturated dicarboxylic acids or their anhydride counterparts include maleic, fumaric, itaconic, and citraconic. The unsaturated compounds may be used alone or admixed with other unsaturated compounds. Also included are polyesters wherein part of the α,β-unsaturated dicarboxylic acid is replaced by saturated dicarboxylic or aromatic dicarboxylic acids, e.g., isophthalic acid and the like. The polyhydric alcohols are preferably dihydric alcohols such as ethylene glycol, however, trihydric and polyhydric alcohols such as trimethyolpropane can be used.

As a general operable definition, the polymerizable material is selected from compounds of the formula

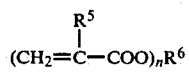

wherein n is 1–4, $R^5$ is hydrogen or methyl and $R^6$ is selected from mono-, di-, tri-, and tetravalent aliphatic hydrocarbons of 1–10 carbons, the divalent groups $+C_rH_{2r}O+_tC_rH_{2r}-$ in which r is 2–8 and t is 1 to 10, and divalent alkylene groups of from 2–10 carbons containing carbonyloxy linkages; vinyl and vinylidene halides; unsaturated amides of 3–20 carbons; vinyl aromatics; and polyesters prepared by the reaction of α,β-unsaturated dicarboxylic acid and/or their anhydrides with polyhydric alcohols, and such polyesters wherein part of the α,β-unsaturated dicarboxylic acid is replaced by saturated aliphatic dicarboxylic acids or aromatic dicarboxylic acids.

Conventional thermal inhibitors which are used in the production of radiation curable compositions, for example hydroquinone, p-methoxyphenol, t-butyl hydroquinone, and hydroquinone bis-glycidyl ether, may be incorporated in the present curable formulations to alter the curing rate and/or to provide longer storage stability. The compositions may also contain other conventional additives, pigments, colorants, flow aids, viscosity modifiers and polymeric additives to promote the properties desired in the cured coating. Examples of polymeric modifiers are acrylate capped polyurethanes, poly(propylene terephthalate), cellulose propionate crotonate, and cellulose acetate butyrate.

The present invention is defined as a photocurable composition comprising ethylenically unsaturated, polymerizable material containing a total of from about 0.1% to about 5.0% (w/w) of one or more compounds of the formula

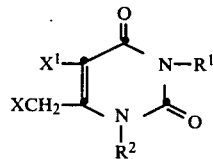

wherein $R^1$ and $R^2$ each is selected from hydrogen; straight or branched alkyl of 1–20 carbons which may be substituted with lower alkoxy or phenoxy; alicyclic of 5–10 carbons; aromatic of 6–12 carbons which may be substituted with up to four lower alkyl groups; and

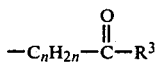

groups wherein n is 1–20, $R^3$ is lower alkyl, aromatic of 6–12 carbons or the radical —O—$R^4$ where $R^4$ is lower alkyl or aromatic of 6–12 carbons; and wherein X and $X^1$ are each selected from chlorine and bromine.

This invention will be further illustrated by the following examples although it will be understood that these examples are included merely for purposes of illustration and are not intended to limit the scope of the invention.

EXAMPLE 1

1,3,6-Trimethyluracil was prepared by the method outlined by F. G. Fisher, W. P. Neumann, and J. Roch, Ann. 633 168 (1960). Chlorine gas (31.4 g) was passed into a slurry of 30.8 g of the 1,3,6-trimethyluracil in 150 ml of water at room temperature during a 90 minute period. The mixture was stirred for 1 hour after addition of the chlorine, cooled and filtered. The product was washed with cold water and dried to give 45 g (93% yield) of 5,5-dichloro-6-hydroxy-1,3,6-trimethyl-5,6-dihydrouracil, m.p. 142°. This compound (35 g) was refluxed for 4 hours with 350 ml. of concentrated HCl, and the resulting solution cooled and filtered. The mother liquors were extracted with chloroform and the extract recovered by evaporation of the solvent. The combined yield was 20 g (45%) of 5-chloro-6-chloromethyl-1,3-dimethyluracil confirmed by chemical analysis, m.p. 122°–5° C.

EXAMPLE 2

Other uracil derivatives prepared by the general method of Example 1 were:
5-Chloro-6-chloromethyl-3-methyluracil—m.p. 107°–9° C.
5-Chloro-6-chloromethyl-1-ethyl-3-methyluracil—m.p. 79°–82° C.
5-Chloro-6-chloromethyl-3-phenyluracil—m.p. 239°–41° C.
6-Bromomethyl-5-chloro-1,3-dimethyluracil—m.p. 141.5°–143° C.

EXAMPLE 3

The uracil derivatives to be evaluated were dissolved in neopentyl glycol diacrylate at 0.5 (w/w) % concentration and a curing profile of the system determined by photocalorimetry. This technique consists of recording the exotherms generated by successive flashes of light from a 200-watt high pressure mercury arc on a sample on the stage of a Perkin-Elmer DSC-1B differential scanning calorimeter. The output of the lamp at the sample stage was 0.024 watts/cm², and the lamp was situated so that the sample and reference stages of the DSC were evenly illuminated. A photographic shutter was interposed between light source and the DSC stage. A sample (10 mg) was placed on the sample stage, equilibrated in a nitrogen atmosphere, and the shutter operated in a series of ⅛ sec. flashes. Each flash produced an exotherm which was recorded on a strip chart recorder and the area under the exotherm calculated with a Vidar 6300 Digital Integrator. The ⅛ second flashes were continued until only a small exotherm was recorded and then the sample was irradiated continuously until polymerization was complete. This final exotherm was also integrated. The percent polymerization was plotted versus time and the velocity constant, $k_{(obs.)}$, was calculated by the following relationship:

$$k_{(obs.)} = \frac{2.303}{t} \log \frac{a}{a-x}$$

where x is the amount reacting in time t, a−x is the amount remaining after time t, as explained in Outlines of Physical Chemistry by Farrington Daniels, John Wiley and Sons, Inc., p. 346, 1948. The values $k_{(obs.)}$ are customarily taken as rate values to indicate the extent of reaction with relation to time. In this case they relate the extent of polymerization to radiation time. A high $k_{(obs.)}$ indicates a composition which cures rapidly.

The data, summarized in Table 1, indicates that the 5-halo-6-halomethyluracils are efficient photoinitiators for acrylic compounds. Derivatives not having the 6-halomethyl group were not effective photoinitiators.

EXAMPLE 4

The compounds to be evaluated as photoinitiators were dissolved in 1:1 by weight styrene solutions of a polyester prepared from a 1:1 acid component mole ratio of isophthalic acid: maleic anhydride, and propylene glycol, having an acid number of 28 (ASTM D-1639-70). A film of wet thickness of 4.0 mils was coated onto a glass plate and cured in air for 1 minute with a Gates 420U11B mercury lamp (80 watts/in.). The cured coatings were stripped from the glass plate and extracted with dichloromethane for 2 hours. The percent extractables was calculated by weight loss of original cured material.

The results summarized in Table 2 show that the combinations of unsaturated polyester resin, styrene, and uracil photoinitiators are radiation curable compositions superior to a well known composition containing Michler's ketone photoinitiator.

EXAMPLE 5

The compositions to be evaluated as photoinitiators were added at 1% (w/w) concentration of a mixture composed of:
  75% Chempol 19.4827, Polyurethane Oligomer, (Freeman Chem. Corp.)
  10% Hydroxypropyl acrylate
  10% 2-Methoxyethyl acrylate
  5% Neopentyl glycol diacrylate.

A film of 4 mil wet thickness was coated onto a glass slide and cured for 30 seconds in a inert atmosphere with a Gates 420U11B mercury lamp (80 watts/in.). The cured films were stripped from the plate and extracted for 2 hours with dichloromethane. The percent extractables was calculated by weight loss of the original cured material.

The results, summarized in Table 3, show that the uracil derivatives are effective photoinitiators for polyurethane oligomeracrylic monomer compositions and that the combination of these ingredients comprise a radiation curable composition which is 97% polymerized by 30 seconds of irradiation with a mercury lamp.

Table 1

Effectiveness of Uracils at 0.5 (w/w) % Concentration as Photoinitiators for Neopentyl Glycol Diacrylate

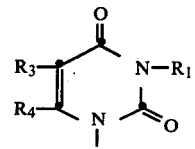

| $R_1$ | $R_2$ | $R_3$ | $R_4$ | $k_{(obs.)}$ |
|---|---|---|---|---|
| H | H | Cl | CH$_2$Cl | 0.73 |
| H | H | Cl | CH$_2$Br | 1.0 |
| CH$_3$ | H | Cl | CH$_2$Cl | 0.95 |
| CH$_3$ | CH$_3$ | Cl | CH$_2$Cl | 1.24 |
| CH$_3$ | CH$_3$ | Cl$_2$ | CH$_3$;OH | 0.038 |

Table 1-continued

Effectiveness of Uracils at 0.5 (w/w) % Concentration as Photoinitiators for Neopentyl Glycol Diacrylate

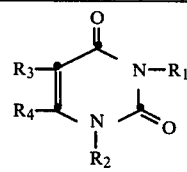

| $R_1$ | $R_2$ | $R_3$ | $R_4$ | $k_{(obs.)}$ |
|---|---|---|---|---|
| Sec-butyl | H | Br | CH$_3$ | 0.19[a] |

[a]At 2.0 (w/w) % concn.

Table 2

Photocurable Composition Based on Styrene-Polyester Solution of Example 4

| Photoinitiator at 1% (w/w) Concn. | % Extractables[b] |
|---|---|
| None | 98.7 |
| 7:1 Michler's Ketone[c] | 72.8 |
| 5-Chloro-6-chloromethyluracil | 60.3 |
| 5-Chloro-6-chloromethyl-1,3-dimethyl-1,3-dimethyluracil | 13.1 |
| 5-Chloro-6-bromomethyluracil | 79.2 |
| 5-Chloro-6-bromomethyl-1,3-dimethyluracil | 20.6 |

[a]Polyester of isophthalic anhydride, maleic anhydride, and propylene glycol.
[b]Dichloromethane.
[c]4,4'-Bis(dimethylamino)benzophenone.

Table 3

Photocurable Composition Based on Mixture of Example 5

| Photoinitiator at 1% (w/w) Concn. | % Extractables[b] |
|---|---|
| None | 100 |
| 5-Chloro-6-chloromethyluracil | 44 |
| 5-Chloro-6-chloromethyl-1,3-dimethyluracil | 3.0 |
| 6-Bromomethyl-5-chlorouracil | 20.2 |
| 6-Bromomethyl-5-chloro-1,3-dimethyluracil | 11.1 |

Although the invention has been described in considerable detail with particular reference to certain preferred embodiments thereof, variations and modifications can be effected within the spirit and scope of the invention.

We claim:

1. A photocurable composition comprising ethylenically unsaturated, polymerizable material containing a total of from about 0.1% to about 5.0% based on monomer weight, of one or more photoinitiators of the formula:

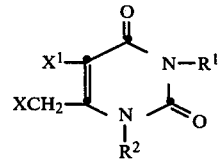

wherein $R^1$ and $R^2$ each is selected from hydrogen; straight or branched alkyl of 1–20 carbons which may be substituted with lower alkoxy or phenoxy; alicyclic of 5–10 carbons; aromatic of 6–12 carbons which may be substituted with up to four lower alkyl groups; and

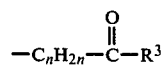

groups wherein n is 1-20, $R^3$ is lower alkyl, aromatic of 6-12 carbons or the radical —O—$R^4$ where $R^4$ is lower alkyl or aromatic of 6-12 carbons; and wherein X and $X^1$ are each selected from chlorine and bromine.

2. The composition of claim 1 wherein said polymerizable material is selected from compounds of the formula

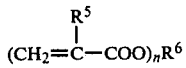

wherein n is 1-4, $R^5$ is hydrogen or methyl and $R^6$ is selected from mono- , di-, tri-, and tetravalent aliphatic hydrocarbons of 1-10 carbons, divalent groups $+(C_rH_{2r}O)+_tC_rH_{2r}-$ in which r is 2-8 and t is 1 to 10, and divalent alkylene groups of from 2-10 carbons containing carbonyloxy linkages; vinyl and vinylidene halides; unsaturated amides of 3-20 carbons; vinyl aromatics; and polyesters prepared by the reaction of $\alpha,\beta$-unsaturated dicarboxylic acid and/or their anhydrides with polyhydric alcohols, and such polyesters wherein part of the $\alpha,\beta$-unsaturated dicarboxylic acid is replaced by saturated aliphatic dicarboxylic acids or aromatic dicarboxylic acids.

3. The composition of claim 1 wherein the photoinitiator is selected from one or more of: 5-chloro-6-chloromethyl-1,3-dimethyluracil; 5-chloro-6-chloromethyl-1-ethyl-3-methyluracil; 5-chloro-6-chloromethyl-3-methyluracil; 5-chloro-6-chloromethyl-3-phenyluracil; 6-bromomethyl-5-chloro-1,3-dimethyluracil; 5-chloro-6-chloromethyluracil; 5-chloro-6-bromomethyluracil; 5-chloro-6-bromomethyl-1,3-dimethyluracil; and 6-bromomethyl-5-chlorouracil.

4. The composition of claim 3 wherein the polymerizable material is selected from the alkyl and hydroxyalkyl esters of acrylic and methacrylic acids.

5. A photocured coating of the composition of claim 1.

6. A substrate coated with the photocured coating of claim 1.

* * * * *